Figure 1:
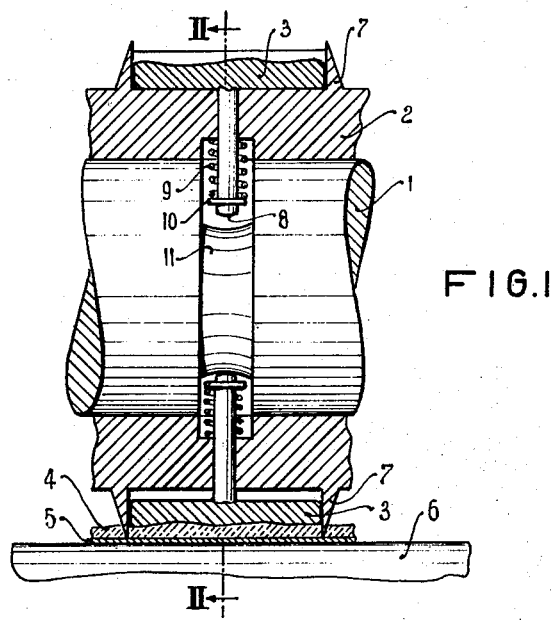

Oct. 21, 1952 W. NEUTELINGS 2,614,511
DEVICE FOR MOLDING SHAPES FROM PLASTIC MATERIAL
Filed Nov. 16, 1946

Inventor:
William Neutelings

Patented Oct. 21, 1952

2,614,511

UNITED STATES PATENT OFFICE 2,614,511

DEVICE FOR MOLDING SHAPES FROM PLASTIC MATERIAL

Willem Neutelings, Bergen op Zoom, Netherlands, assignor to Industrie-en Handelmaatschappij "De Vuurslag" C. V., Bergen op Zoom, Netherlands, a company of The Netherlands Application November 16, 1946, Serial No. 710,343
In Belgium August 16, 1939

6 Claims. (Cl. 107—23)

This invention relates to a device for moulding shapes from plastic material, such as dough, in which this material is rolled out on a conveyor-band between a die-roller and a counter-roller.

With devices of this kind biscuits formed with an embossed surface are only imperfectly shaped. The sheet of dough has a fixed uniform thickness, whereas the die-roller is irregularly embossed so that the dough does not reach the deepest points and the dough-shaped therefore, does not obtain the desired relief, all over its surface, while at the shallow points too much dough is accumulated and the shape will be deformed.

The die-roller and the counter-roller only meet each other on a narrow contact surface, so that the dough, particularly when it should be moulded by a die-roller having a strongly varying relief, follows the way of the lowest resistance and will escape laterally whereby the texture of the dough obtained during the rolling process is modified which is later revealed e. g. by fracture or discoloration after the baking process.

The present invention has for its object to improve the rotary moulding machine in such a manner that the above mentioned drawbacks are eliminated, so that dough shapes with a large difference in relief may be easily and perfectly moulded.

According to the invention movable die-plates or plunger-members are mounted between the cutting edges or knives of the cutting roller which define the outer circumference of the dough shapes to be moulded, said die-plates or plunger members having a compulsory inwards and outwards sliding movement and are so formed, that the tangent on the sheet of dough remains at equal or substantially equal distance from the axis of the cutting roller, in such a manner that said members are adapted to press figures in the dough when cutting out the dough pieces.

Moreover the invention includes means for varying the stroke of the plunger members centrally and according to the thickness of the sheet of dough during the rotation of the die-roller as far as said stroke coincides with the pressing on the sheet of dough. Said adjustment presents a great advantage.

In order to mould embossed shapes as perfectly and uniformly as possible, the counter roller finally consists of such an elastic material that said roller in consequence of the pressure exerted by the die-roller is depressed on the whole or substantially the whole width of the plunger member so that at the place, where the dough piece is moulded a flattened surface is obtained.

Figure 2:
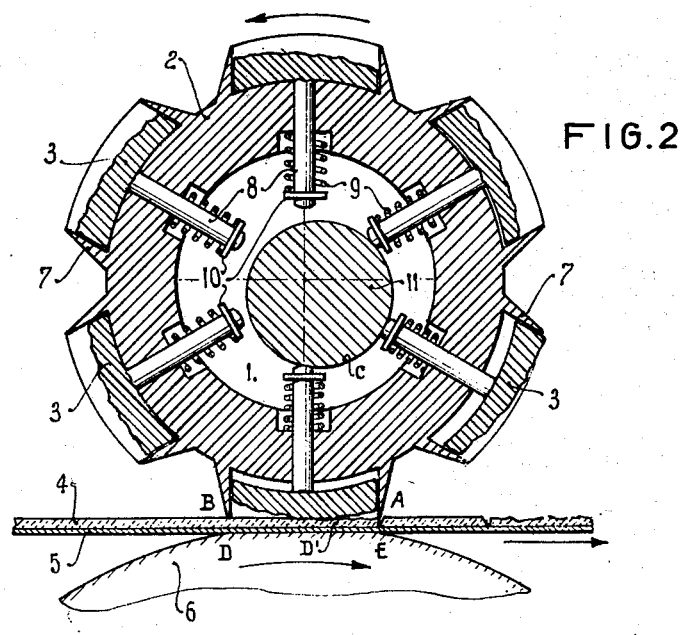

In the drawing which shows an embodiment of the invention, Fig. 1 is an axial sectional view of the die-roller with two opposed plungers members. Fig. 2 is a cross sectional view of the die-roller along the line II—II of Fig. 1.

The die-roller has a shaft 1 on which the roller 2 is rotatably mounted. The sheet of dough 4 is fed between the die-roller and a counter roller 6 by a conveyor-band 5. The roller 2 is provided with cutting edges or knives 7 which are formed in conformity with the outer circumference of the dough shapes to be cut out. A die-plate or plunger-member 3 wherein the figure is formed which is to be depressed into the sheet of dough is slidably and adjustably mounted between the cutting edges 7. Said slidable and adjustable mounting may for instance be obtained as follows:

The plunger member 3 is secured to a stem 8 having a collar 10. A spring 9 surrounds the stem 8 and bears against the collar 10 and against the bottom of a cylindrical bore provided in the inner wall of the roller 2. The spring 9 tends to urge the plunger member 3 towards the centre of the shaft 1, but the bottom of an eccentric groove 11 of the shaft 1 exerts a radially outwards directed pressure so that the plunger member is forced against the sheet of dough. When the shaft 1 is rotated with respect to the roller 2 the eccentric portion 11 thereof will vary the length of the stroke of the plunger member 3 during the contact of said latter with the sheet of dough, whereby the surfaces of the sheets of dough of different thickness may be accurately pressed. Moreover the plunger member has at A a greater thickness than at B. The outer circumference and the form of the eccentric part 11 correspond to the thicknesses A and B of the plunger member. Thus, if any two radial lines are drawn from the center of roller 2 through the eccentric 11 and one of the plungers 3, it will be found that the difference between the lengths of those portions of these lines which extend from the center of roller 2 to the outer surface of eccentric 11 is equal to the difference between the lengths of those portions of these lines which extend from the center of roller 2 to the outer working face of plunger 3. The reference C indicates the extreme point of the eccentric part. It follows thus, that during the whole moulding process of the dough shape D' the plunger member 3 penetrates into the sheet of dough to a uniform depth determined by the location of point C of eccentric 11, whereby in combination with the action of the flattened contacting surface of the counter-roller 6 the finest reliefs may be completely and exactly produced in the dough shape. Said counter roller 6 consists of very elastic material and the contacting surface which is formed thereon through the action of the pressure exerted by the die-roller is indicated by D—E. Said contacting surface D—E presses against the cutting edges 7 to prevent the dough from escaping laterally.

What I claim is:

1. In a device for molding shapes from plastic material such as dough, in combination, a rotatable roller; a counter roller cooperating therewith; means for feeding the material in a continuous sheet between said two rollers; at least one movable plunger member for making impressions in said material; means carried by said rotatable roller for reciprocating said plunger member radially inward and outward of said rotatable roller; resilient means yieldably opposing the outward movement of said plunger member; and a working face forming part of said plunger member, the said working face sloping inwardly from the leading edge thereof toward the axis of the rotatable roller to the same extent that said plunger member is moved outwardly of said rotatable roller by said reciprocating means, throughout the molding operation of the plunger on the dough, whereby the area of contact of said working face with the sheet of material remains at a substantially constant distance from the axis of the rotatable roller during rotation of the latter.

2. In a device for molding shapes from plastic materials such as dough, in combination, a rotatable roller; a counter roller cooperating therewith; means for feeding the material in a continuous sheet between said two rollers; at least one set of cutting means carried by said rotatable roller and extending radially therefrom; at least one plunger member movable between said cutting means for making impressions in said material; means carried by said rollers reciprocating said plunger member radially inward and outward of said rotatable roller; and a head portion forming part of said plunger member, the said head portion increasing in thickness in the direction of rotation of said rotatable roller, whereby the area of contact of said head portion with the sheet of material remains at a substantially constant distance from the axis of the rotatable roller during the molding of the dough.

3. In a device for molding shapes from plastic materials such as dough, in combination, a rotatable roller; a counter roller cooperating therewith; means for feeding the material in a continuous sheet between said two rollers; at least one set of cutting means carried by said rotatable roller and extending radially therefrom; at least one plunger member movable between said cutting means for making impressions in said material; means carried by said rollers reciprocating said plunger member radially inward and outward of said rotatable roller; resilient means yieldably opposing the outward movement of said plunger member; and a working face forming part of said plunger member, the said working face sloping, in a direction opposite to the direction of rotation of said rotatable roller, inwardly toward the axis of said rotatable roller to the same extent that said plunger member is moved outwardly of said rotatable roller by said reciprocating means, whereby the area of contact with the sheet of material remains at a substantially constant distance from the axis of the rotatable roller during the molding operation.

4. In a device for molding shapes from plastic materials such as dough, in combination, a rotatable roller; a counter roller cooperating therewith; means for feeding the material in a continuous sheet between said two rollers; at least one movable plunger member for making impressions in said material; means carried by said rotatable roller for reciprocating said plunger member radially inward and outward of said rotatable roller; and a head portion forming part of said plunger member, the thickness of said head portion in a plane perpendicular to the axis of rotation increasing in the direction of rotation of the rotatable roller and the said increase being inversely proportional to the outward movement of the plunger member during the molding operation.

5. In a device for molding shapes from plastic, such as dough, in combination, a rotatable roller; a counter-roller cooperating therewith, the said counter-roller having an outer face made of elastic material; means for feeding the material in a continuous sheet between said two rollers; at least one movable plunger member for making impressions in said material; means carried by said rotatable roller for reciprocating said plunger member radially inward and outward of said rotatable roller; and a head portion forming part of said plunger member, the said head portion increasing in thickness in the direction of rotation of said rotatable roller, the said increase in thickness being inversely proportional to the outward movement of said plunger member, whereby the area of contact of said head portion with the sheet of material remains at a substantially constant distance from the axis of the rotatable roller during rotation of the latter so that the said counter roller is impressed by substantially the entire circumferential extension of said plunger member and a flattened mould surface is obtained in the material.

6. In a device for molding shapes from plastic, such as dough, in combination, a rotatable roller; a counter-roller cooperating therewith, the said counter-roller having an outer face made of elastic material; means for feeding the material in a continuous sheet between said two rollers; at least one set of cutting means carried by said rotatable roller and extending radially therefrom; at least one plunger member movable between said cutting means for making impressions in said material; means carried by said rollers reciprocating said plunger member radially inward and outward of said rotatable roller; resilient means yieldably opposing the outward movement of said plunger member; and a head portion forming part of said plunger member, the thickness of said head portion in a plane perpendicular to the axis of rotation decreasing in a direction opposite to the direction of rotation of the rotatable roller and the said decrease being substantially equal to the increase in the outward movement of the plunger member during rotation of said plunger in contact with the counter roller.

WILLEM NEUTELINGS.

REFERENCES CITED

The following references are of record in the file of this patent:

UNITED STATES PATENTS

| Number | Name | Date |
|---|---|---|
| 2,344 | Nevins | Nov. 10, 1841 |
| 6,574 | Fairlamb et al. | June 13, 1831 |
| 28,815 | Sowle | June 19, 1860 |
| 29,295 | Marsh | July 24, 1860 |

FOREIGN PATENTS

| Number | Country | Date |
|---|---|---|
| 145,136 | Switzerland | Feb. 15, 1931 |
| 461,263 | Great Britain | Feb. 15, 1937 |
| 463,697 | Great Britain | Apr. 5, 1937 |
| 470,424 | Germany | Jan. 15, 1929 |